April 16, 1968 | AKIRA HIROTA | 3,378,647

MAGNETIC HEAD WITH REMOVABLE HEAD TIP ASSEMBLY

Filed June 1, 1964 | 4 Sheets-Sheet 1

INVENTOR.

Akira Hirota

BY

Fred Zelman agent

INVENTOR.
Akira Hirota
BY
Fred Feldman
agent

MAGNETIC HEAD WITH REMOVABLE HEAD TIP ASSEMBLY

Filed June 1, 1964 4 Sheets-Sheet 3

INVENTOR.
AKIRA HIROTA
BY
agent

INVENTOR.
Akira Hirota
BY
Fred Ielson
Agent

United States Patent Office 3,378,647
Patented Apr. 16, 1968

3,378,647

MAGNETIC HEAD WITH REMOVABLE HEAD TIP ASSEMBLY

Akira Hirota, Ohta-ku, Tokyo, Japan, assignor to Victor Company of Japan, Limited, Kanagawa-ku, Yokohama-shi, Kanagawa-ken, Japan Filed June 1, 1964, Ser. No. 371,556
Claims priority, application Japan, June 5, 1963, 38/29,410
4 Claims. (Cl. 179—100.2)

ABSTRACT OF THE DISCLOSURE

A magnetic head wherein a transformer core is coupled electromagnetically with a magnetic head core by one turn of a closed loop in a manner such that the magnetic head core can be readily exchanged. The head is simple and very compact in construction and is particularly advantageous for use in recording and reproducing high frequency signals.

This invention relates to a magnetic head utilized in a magnetic recording and reproducing apparatus in which signals of high frequencies such as the television video signals are recorded and reproduced, and in particular, relates to a magnetic head comprising a magnetic head tip assembly which acts as a magneto-electric transducer having a gap at the extremity thereof and a magnetic core, used for a transformer and having windings on it acting as a separate input and output transformer, said magnetic core being located in the vicinity of said magnetic head and combined electromagnetically with said magnetic head by means of an electrical conductor of one turn.

It is a principal object of this invention to provide a magnetic head whose construction is simple and can be miniaturized.

It is another object of this invention to provide a magnetic head in which the loss in the electric characteristic can be reduced in the high frequency band especially thereby the sensitiveness in magnetic recording and reproducing is made extremely high.

It is a further object of this invention to provide a magnetic head having a construction which is easily interchangeable.

Figure 1:
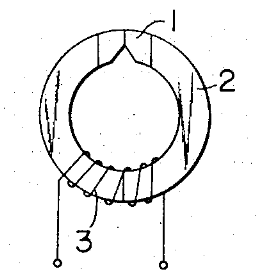
Figure 2:
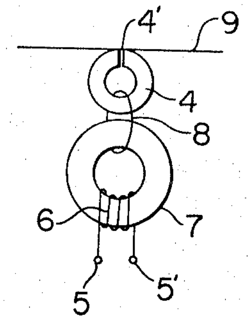
Figure 3:
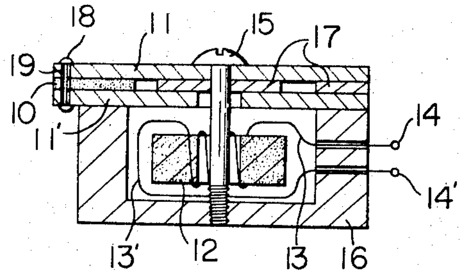
Figure 4:
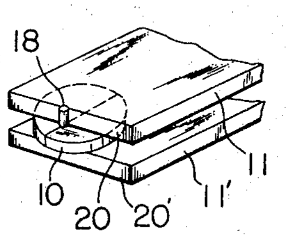
Figure 5:
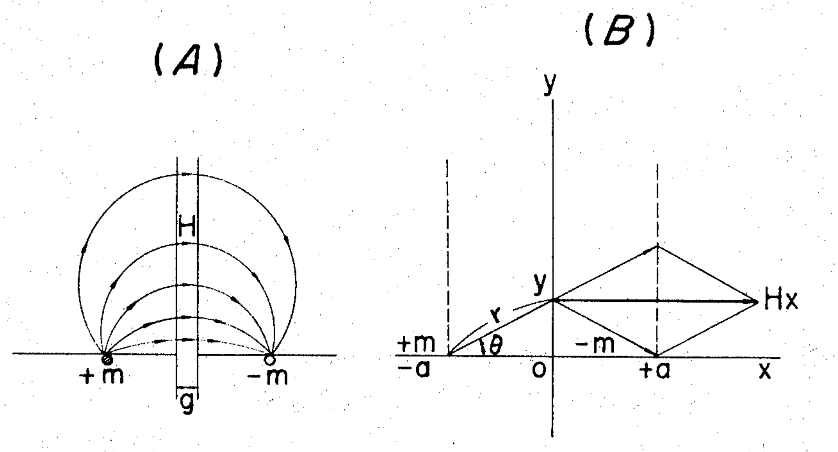
Figure 6:
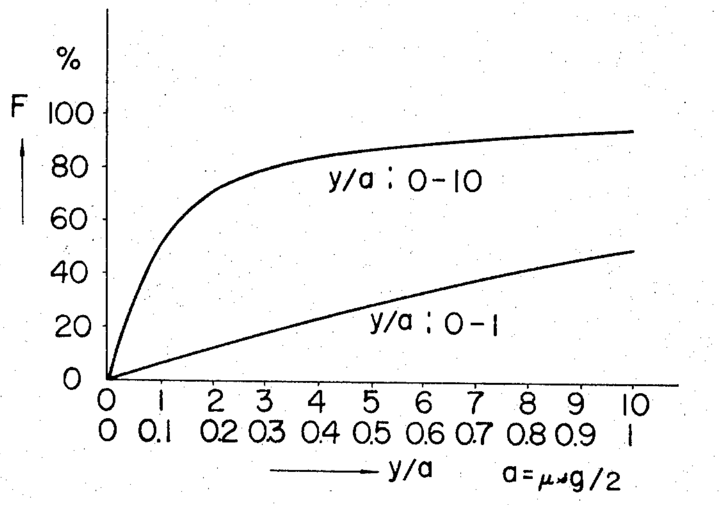
Figure 7:
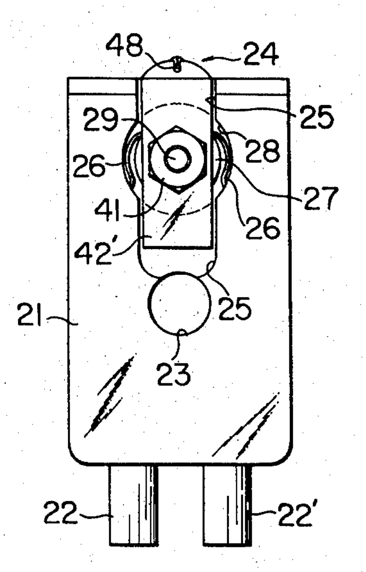
Figure 8:
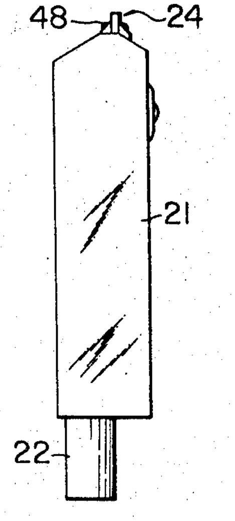
Figure 9:
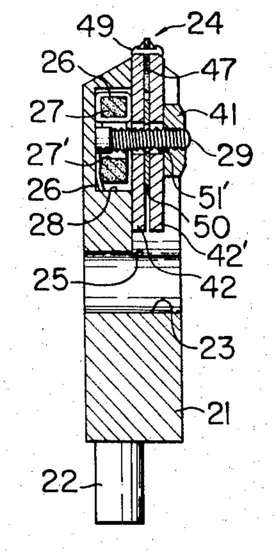
Figure 10:
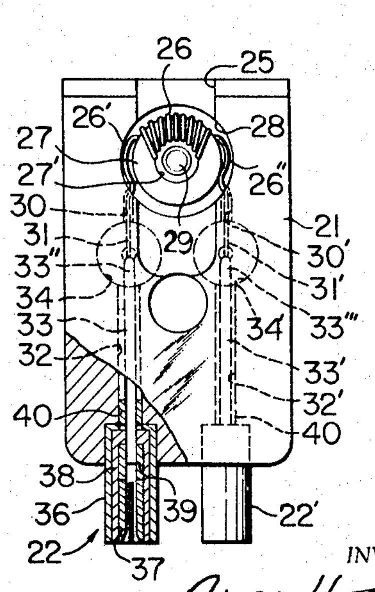
Figure 11:
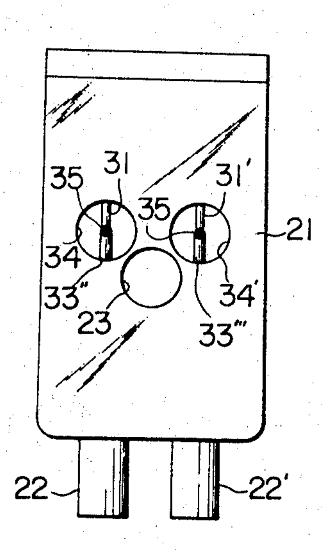

The objects and advantages of this invention will become readily apparent from the following detailed description taken in conjunction with accompanying drawings, in which:

FIG. 1 is a skeleton diagram showing the conventional magnetic head utilized for magnetic recording and reproducing apparatus, FIG. 2 is a skeleton diagram explaining the conventional means in which the magnetic detector is directly combined electromagnetically with an input and output transformer, FIG. 3 is a vertical sectional view of an embodiment the magnetic head provided in accordance with subject invention, FIG. 4 is a perspective view of a part of another embodiment of the magnetic head provided in accordance with subject invention, FIG. 5(A) and FIG. 5(B) are diagrams explaining the principle of subject invention, FIG. 6 is a graph explaining the principle of subject invention, FIG. 7 is a front elevational view of another embodiment of the magnetic head provided in accordance with subject invention, FIG. 8 is a side elevational view of the embodiment shown in FIG. 7, FIG. 9 is a sectional view of the embodiment shown in FIG. 7 sectioned at its center line, FIG. 10 is a front elevational view of the embodiment shown in FIG. 7 with partially sectioned and with the magnetic head tip assembly removed, FIG. 11 is a back view of the embodiment shown in FIG. 7, FIG. 12(A) and FIG. 12(B) are a front elevational view and a side elevational view, respectively, of the magnetic head tip assembly shown in FIG. 7, and FIG. 13(A) and FIG. 13(B) are a front elevation view and a side elevational view, respectively, of another embodiment of the magnetic head tip assembly.

In FIG. 1, the magnetic head comprises a metallic member 1 of magnetic property, a semiconductor member 2 of magnetic property, and a coil 3. A defect of the conventional magnetic head is in the bulky construction and, therefore, in order to eliminate the defect it was proposed to combine electromagnetically the magneto electric transducer with the input and output transformer by means of a conductor of one turn and this combination has been well known. The principle stated above is explained as follows referring to FIG. 2: a magnetic head core 4 having a gap 4′ at the extremity thereof is combined electromagnetically with a magnetic core 7 used as a transformer and separated from said head core 4 by means of a conductor 8 wound in ring form, said magnetic core 7 having a coil 6 with terminals 5 and 5′ wound thereon. Magnetic reproduction of the arrangement is effected as follows: when a magnetic recording medium 9 having record thereon moves in contacting with gap 4′ the flux passing through head core 4 varies and a current flows through conductor 8 to suppress the variation in the flux. The current varies the flux in magnetic core 7 to generate an output voltage at terminals 5 and 5′. Magnetic recording of the arrangement is effected as follows: recording signals applied to terminals 5 and 5′ vary the flux in magnetic core 7 and a current flows through conductor 8 to suppress the variation in the flux. The current varies the flux in head core 4 to generate leakage flux across gap 4′ and the signals are recorded on the magnetic recording medium 9.

The invention is an improvement of the arrangement stated above and embodiments of the invention are explained as follows:

In FIG. 3, a magnetic head core 10 made of semiconductive material, such as ferrite, garnet etc., is held at the upper and lower side thereof by holding plates 11 and 11′ made of conductive material. The winding of an input and output transformer is wound on a magnetic core 12 and leading conductors 13 and 13′ of the winding are connected to terminals 14 and 14′. Head core 10 is combined with a base 16 for mounting head core 10 by means of a screw 15 made of conductive material, said base 16 being made separately from head core 10. Spacers 17 are provided between holding plates 11 and 11′ and holding plates 11 and 11′ are fastened with each other by a conductor 18 passing through a hole 19 provided in holding plate 11, head core 10 and holding plate 11′ in the order and short-circuiting holding plates 11 and 11′. A loop is completed by this construction from conductor 18 through holding plate 11, screw 15, base 16 and holding plate 11′ to conductor 18 and the loop combines electromagnetically head core 10 with magnetic core 12. The combination is electromagnetically accomplished by means of the loop having only one turn so that the loss due to the self-inductance is reduced comparing with the conventional method having several turns and leading conductors and, therefore, the characteristic especially in the high frequency band is improved. Further, when the damage, wear and tear of head core 10 is remarkable, interchanging it is easily effected by removing screw 15 from base 16.

In an embodiment shown in FIG. 4, the extremity of head core 10 is slightly projected from the front ends 20 and 20' of holding plates 11 and 11'. By this construction, the magnetic tape is not affected disadvantageously by front ends 20 and 20' even when head core 10 wears to some extent, however, there is a defect that head core 10 wears and tears easily.

It is necessary to provide conductor 18 as adjacent as possible to the extremity of head core 10 which contacts with the magnetic tape according to the following reason. In an idealized reproducing head shown in FIG. 5(A), the extent of the penetration of the flux coming out of a magnetic pole, which is brought adjacent a gap, into the gap is discussed. Assuming that magnetic poles having magnesium $+m$ and $-m$ per unit length of the head is located against the surface of the head with a gap $g$, the magnetic field generated in the gap is a parallel magnetic field substantially perpendicular to the surface of the head. Therefore, the discussion concerning to the penetration of the flux shown in FIG. 5(A) can be replaced by the discussion concerning to the penetration of the flux shown in FIG. 5(B), in which the material of the same permeability as that of the magnetic head is filled within the gap and the width of the gap is enlarged by a factor $\mu_s$. Here, assuming the permeability of vacuum is $\mu_0$ and the permeability of the head is $\mu$, it is obtained that $\mu=\mu_s\mu_0$. It is also assumed that the horizontal space opposite to the head is filled with material having the same permeability. In FIG. 5(B), the positions of the magnetic poles are assigned by the notations $(+a, o)$ and $(-a, o)$ and $a$ is $\mu_s \times g/2$. The magnetic field $H_1$ due to the pole $+m$ at a point $(o.y)$ on the axis $y$ is given by the following equation:

$$H_1=\frac{m}{2\pi\pi}\cdot\frac{1}{r} \quad (1)$$

Here, $r$ . . . distance between $y$ and pole $+m$. The magnetic field due to pole $-m$ at the same point $(o.y)$ is of the same magnitude as $H_1$ but having a different direction. Therefore, the magnetic field H due to pole $+m$ and $-m$ at the point is given as follows and has a direction parallel to the axis $x$.

$$H=2H_1\times\cos\theta=2H_1\times\frac{a}{r} \quad (2)$$

Here, $a$ . . . distance from the origin to pole $+m$ or $-m$ Equations 1 and 2 gives the magnetic field as follows:

$$H=\frac{m}{\pi\mu}\cdot\frac{a}{r^2}=\frac{m}{\pi\mu}\cdot\frac{a}{a^2+y^2} \quad (3)$$

The magnetic flux $\phi_y$ passing through the plane defined by the axis $y$ is given as follows by integrating Equation 3 from $o$ to $y$:

$$\phi_y=\int_0^y \mu H dy=\frac{m}{\pi}\tan^{-1}\frac{y}{a} \quad (4)$$

The total magnetic flux $\phi_\infty$ passing through the total plane defined by the axis $y$ is given as follows:

$$\phi_\infty=\frac{m}{2} \quad (5)$$

The ratio F of the flux existing in the width $y$ to the total flux is obtained by combining Equations 4 and 5.

$$F=\phi_y/\phi_\infty=\frac{2}{\pi}\tan^{-1}\frac{y}{a} \quad (6)$$

The actual values of the ratio F are plotted in FIG. 6. When $\mu_s=300$ and $g=0.001$ mm., in other words, $$a=\mu_s\cdot g/2=0.15$$

the following data are obtained, if $y=1$ mm. then $y/a=6.7$ and $F=90\%$
$y=0.15$ mm. then $y/a=1.0$ and $F=50\%$
$y=0.05$ mm. then $y/a=0.33$ and $F=20\%$ from FIG. 6.

From FIG. 6, it is understood that the width $y$ of the head having about 1 mm. is sufficient to provide the ratio F high and the width $y$ having more than 1 mm. is of no means. It is also understood that if a hole is provided in the width $y$ of 0.15 mm. and a conductor forming a loop of one turn is inserted in the hole, the loss of the magnetic flux is 50%, and if a hole in the width $y$ of 0.05 mm., the loss is 20%. Therefore, it is concluded that it is necessary to provide the hole as adjacent as possible to the extremity of the head core.

In FIGS. 7 to 12, a cartridge 21 made of conductive material and incorporating the magnetic head of this invention is revealed. Cartridge 21 is provided with a pair of terminals 22 and 22'', a hole 23 for mounting said cartridge 21, a recess 25 for fitting and fixing a magnetic head tip assembly 24, a circular recess 28 in which a toroidal magnetic core 27 for a transformer having a toroidal opening 27' with a coil 26 wound on a part of the core is inserted, and a stud screw 29 imbedded integrally with and at the center of recess 28 for fixing said magnetic core 27. Ends 31 and 31' of leading conductors 26' and 26'', respectively, extending from the ends of coil 26 and passing through holes 30 and 30' used for leading conductors 26' and 26'', are butted by soldering is circular recesses 34 and 34' provided in the back surface of cartridge 21 against ends 33'' and 33''' of contact bars 33 and 33' extending from the ends of terminals 22 and 22' and passing through contact holes 32 and 32' used for contact bars 33 and 33', respectively. It is preferable to fill the circular recesses with proper insulating resin material after the soldering is finished. Terminals 22 and 22' comprise enclosures 36 of conductive metal material at their outer surface and contact tips 37 of conductive material at their inner side, sleeves 38 of insulating material being provided between enclosures 36 and contact tips 37. Contact tips 37 are connected to contact bars 33 and 33' by means of sleeves 39 of conductive material and spacers 40 of insulating material are provided in holes 32 and 32' to fix and insulate contact bars 33 and 33' from the walls of the holes. Terminals 22 and 22' are secured to the end portions of cartridge 21 by suitable means.

Figure 12:
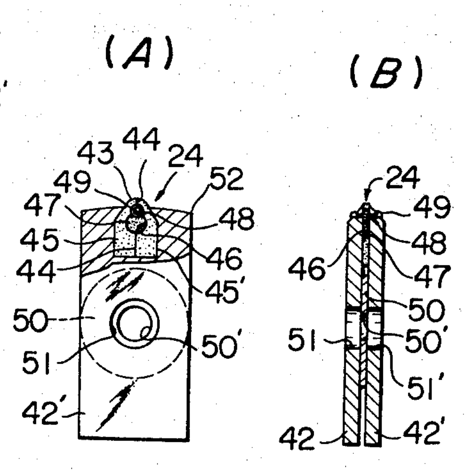
Figure 13:
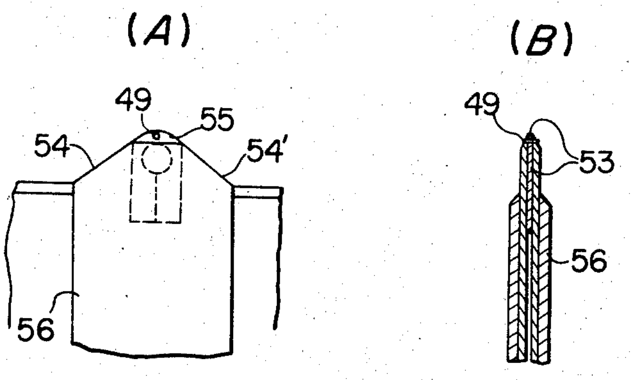

Head tip assembly 24 is inserted into recess 25 and affixed by stud screw 29 and nut 41 with magnetic core 27. In FIG. 12 the detailed construction of head tip assembly 24 is disclosed. A magnetic head core 43 made of magnetic material, such as ferrite etc., is held by holding plates 42 and 42' and comprises a pair of thin pieces 45 and 45' of magnetic material, an extremely thin spacer 44 of insulating material, such as glass fiber of about 1 micron, being juxtaposed between said pair of thin pieces. A hole 46 is provided in spacer 44 at the upper part thereof and is filled with magnetic material 47 such as ferrite. A hole 48 is provided in holding plates 42 and 42' for introducing conductor 49 and is preferably filled with proper insulating resin material. The ends of conductor 49 are fixed to holding plates 42 and 42', respectively, by proper means such as soldering. The diameter of holes 51 and 51' provided in the center of holding plates 42 and 42', respectively, are larger than the diameter of hole 50' of washer 50 of insulating material.

Since, as mentioned above, head core 43 is extremely miniaturized and made of thin and comparatively hard magnetic material, insulating spacer 44 must be made extremely thin. Therefore, in manufacturing the magnetic head, it is advantageous that insulating spacer 44 is interposed between thin pieces 45 and 45' separately provided all over the entire length of the thin pieces not only over the extremity of the thin pieces contacting with the magnetic tape. It is useful to improve the magnetic coupling to provide a hole 46 in insulating spacer 44 between thin pieces 45 and 45', to take off the unnecessary part of insulating spacer 44 existing in hole 46 and to fill hole 46 with magnetic material 47 having high permeability such as ferrite. A magnetic head tip assembly with extremely high sensitivity can be obtained by the construction stated above in either recording or reproducing process. In other words, this is accomplished by the fact that the magnetic reluctance between thin pieces 45 and 45' becomes extremely smaller than the magnetic reluctance of the gap portion.

The magnetic recording and reproducing of the magnetic head provided in accordance with the invention are explained concretely as follows:

When the magnetic head is used to record, signals to be recorded are applied to coil 26 across terminals 22 and 22'. The flux in magnetic core 27 varies and, therefore, a current flows through a loop circuit consisting cartridge 21, stud screw 29, nut 41, holding plate 42, conductor 49, holding plate 42' and cartridge 21 to suppress the variation in the flux. Magnetic flux is generated in head core 43 in response to the current in the loop circuit, so the leakage flux is generated in the gap of head core 43 to record the signals on the recording medium.

When the magnetic head is used to reproduce, the recording medium having record thereon moves in contacting with the gap of head tip assembly 24. The magnetic flux passing through thin pieces 45 and 45' varies and therefore, a current flows in said loop circuit to suppress the variation. An output voltage is generated in coil 26 wound on a part of magnetic core 27 in response to the current to reproduce the signals recorded previously on the recording medium.

In the embodiment of the magnetic head shown in FIG. 12, a fault has been recognized that the holding plate with a pair of rectangular shoulders 52 may injure the magnetic tape while the magnetic tape is moving. In the embodiment of the magnetic head shown in FIG. 13 thin defect is eliminated by cutting the rectangular part off. The inclination of skirts 54 and 54' of holding plate 56 is made substantially equal to the inclination of the extremity of head core 53 and tapered part 55 at the extremity of holding plates 56 is made in the same plane as the plane determined by the extremity of head core 53. This construction enables the extremity of head core 53 made of semiconductor magnetic material such as ferrite, garnet having an extremely thin shape and relatively hard and brittle natures to subject no damage by the shock brought by contacting with the magnetic tape. Forming the extremities of head core 53 and holding plates 56 is effected after head core 53 is held tightly between holding plates 56 so it is easily finished to make the extremities the same figure.

While preferred embodiments of the present invention are disclosed, it is recognized that the scope of the present invention is not limited thereto and it is of course possible to modify the embodiments without departing from the principle of subject invention. It is therefore intended that the scope of the present invention be defined in the appended claims.

What is claimed is:

1. A magnetic head comprising a magnetic head tip assembly including a magnetic head core having a gap at an extremity thereof and serving as an electromagnetic transducer, a pair of plates of conductive material holding said magnetic head core therebetween, a conductor extending through said magnetic head core and electrically connecting said pair of plates, a transformer including a core and a winding on said transformer core, a base of conductive material fixedly supporting said magnetic head tip assembly and said transformer, and a fixing member of conductive material fixedly connecting said magnetic head tip assembly and said base; said pair of plates, said conductor, said base and said fixing member forming a one-turn winding electromagnetically coupling said magnetic head core and said transformer core.

2. A magnetic head as defined in claim 1, in which said magnetic head tip assembly is removable from said base by demounting of said fixing member.

3. A magnetic head as defined in claim 1 in which the thickness of said magnetic head core in a direction parallel to said gap is small and in which said pair of plates are formed in accordance with the shape of said magnetic head core at both sides of said gap.

4. A magnetic head comprising a magnetic head tip assembly including a magnetic head core having a gap at an extremity thereof and serving as an electromagnetic transducer, a pair of plates of conductive material holding said magnetic head core therebetween, a conductor extending through said magnetic head core and electrically connecting said pair of plates, a transformer including a core and a winding on said transformer core, a base of conductive material fixedly supporting said magnetic head tip assembly and said transformer, a screw of conductive material having an end portion secured to said base and having an opposite end portion extending through said transformer and said plates, and a nut of conductive material threaded on said opposite end of said screw for holding said transformer and said magnetic head tip assembly on said base; said pair of plates, said conductor, said base, said screw and said nut forming a one-turn winding electromagnetically coupling said magnetic head core and said transformer core.

References Cited

UNITED STATES PATENTS

| | | | |
|---|---|---|---|
| 2,532,100 | 11/1950 | Howell | 179—100.2 |
| 2,840,643 | 6/1958 | Brower et al. | 179—100.2 |

TERRELL W. FEARS, *Primary Examiner.*

BERNARD KONICK, *Examiner.*

J. R. GOUDEAU, *Assistant Examiner.*